US 8,698,979 B2

(12) United States Patent
Zhao et al.

(10) Patent No.: US 8,698,979 B2
(45) Date of Patent: Apr. 15, 2014

(54) ELECTROLUMINESCENT DISPLAYS

(75) Inventors: Yong Zhao, Bar Hill (GB); Christopher James Newton Fryer, Cambridge (GB); Richard Guy Blakesley, Cambridge (GB); Christopher Miles Evans, Saffron Walden (GB); William Frank Tyldesley, Dis (GB)

(73) Assignee: Mflex UK Limited, Cambridge (GB)

( * ) Notice: Subject to any disclaimer, the term of this patent is extended or adjusted under 35 U.S.C. 154(b) by 437 days.

(21) Appl. No.: 12/413,096

(22) Filed: Mar. 27, 2009

(65) Prior Publication Data
US 2009/0273737 A1 Nov. 5, 2009

Related U.S. Application Data

(63) Continuation-in-part of application No. 11/570,976, filed as application No. PCT/GB2005/002298 on Jun. 10, 2005.

(30) Foreign Application Priority Data

Jun. 11, 2004 (GB) .................................. 0413121.5
Mar. 29, 2008 (GB) .................................. 0805751.5

(51) Int. Cl.
*G02F 1/1335* (2006.01)
(52) U.S. Cl.
USPC .......................................................... 349/69
(58) Field of Classification Search
USPC .......................................................... 349/69
See application file for complete search history.

(56) References Cited

U.S. PATENT DOCUMENTS

| 4,469,381 | A | 9/1984 | McGuffie |
| 4,752,771 | A | 6/1988 | Kotogi et al. |
| 5,121,234 | A | 6/1992 | Kucera et al. |
| 5,353,133 | A * | 10/1994 | Bernkopf ........................ 349/5 |
| 6,842,170 | B1 | 1/2005 | Akins et al. |
| 6,924,873 | B2 | 8/2005 | Asada |
| 7,486,342 | B2 * | 2/2009 | Mathey et al. ................. 349/16 |
| 7,649,595 | B2 * | 1/2010 | Masutani et al. .............. 349/89 |
| 2002/0001052 | A1 * | 1/2002 | Kornfield et al. ............. 349/88 |
| 2002/0113753 | A1 * | 8/2002 | Sullivan et al. .................. 345/6 |
| 2002/0163606 | A1 | 11/2002 | Kitai et al. |
| 2005/0129875 | A1 * | 6/2005 | Shukla et al. ................ 428/1.2 |
| 2007/0247066 | A1 * | 10/2007 | Tokairin et al. .............. 313/506 |

FOREIGN PATENT DOCUMENTS

| CN | 2005800257147 | 9/2008 |
| EP | 0131635 | 1/1985 |
| EP | 1380879 A1 | 1/2004 |

(Continued)

OTHER PUBLICATIONS

Li Weiti, et al., Title: LCD, pp. 27-78, Dated Mar. 31, 2000.

(Continued)

*Primary Examiner* — Timothy L Rude
(74) *Attorney, Agent, or Firm* — Keating & Bennett, LLP

(57) ABSTRACT

A display including an electroluminescent layer, a liquid crystal layer, a barrier layer arranged between the electroluminescent layer and the liquid crystal layer to restrict migration of liquid crystal from the liquid crystal layer to the electroluminescent layer, and a first electrode and a second electrode arranged such that the electroluminescent layer and the liquid crystal layer are disposed between the first and second electrodes and arranged to apply an electric field across both the electroluminescent layer and the liquid crystal layer.

18 Claims, 2 Drawing Sheets

(56) References Cited

FOREIGN PATENT DOCUMENTS

| | | |
|---|---|---|
| GB | 2348039 | 9/2000 |
| GB | 2359178 | 8/2001 |
| JP | 49-86034 | 8/1974 |
| JP | S58-115780 U | 8/1983 |
| JP | 11-38918 | 2/1999 |
| JP | 2000-182769 | 6/2000 |
| JP | 2003-338385 | 11/2003 |
| JP | 2004-111175 | 4/2004 |
| WO | 91/16722 | 10/1991 |
| WO | 99/04604 A1 | 1/1999 |
| WO | 2008/075001 | 6/2008 |

OTHER PUBLICATIONS

Chinese Exam Report, dated Sep. 1, 2008.
W. A. Thornton, Title: Electroluminescence in Zinc Sulfide, Physical Review, vol. 102, No. 1, Apr. 1, 1956, pp. 38-45.
F. A. Schwertz, et al., Title: Voltage-Dependence of Electroluminescent Brightness. I. Dielectric-Imbedded Phosphors, Letters to the Editor, Dated Mar. 4, 1955, pp. 1133-1134.
UK Application No. 0805751.5 Search Report dated Jul. 28, 2008.
Drzaic, Title: Polymer Dispersed Nematic Liquid Crystal for Large Area Displays and Light Valves, J. Appl. Phys. 60 (6), Dated Sep. 15, 1986, pp. 2142-2148.
Kenneth R. Brown, Title: EP Application No. 05750278.3-2205 in the Name of Pelikon Limited—Third Party Obersvations, dated Aug. 7, 2008, pp. 1-7.
EP Application No. 005750278, Office Action dated Jun. 5, 2009, pp. 1-4.
EP Application No. 005750278, Office Action dated Jan. 9, 2009, pp. 1-5.
Paul S. Drzaic, Title: Liquid Crystal Dispersions, 1995, pp. 1-429.
Fryer et al., "Electroluminescent Displays", U.S. Appl. No. 11/570,976, filed Aug. 6, 2008.
Fryer, "Human Interface Device and Related Methods", U.S. Appl. No. 12/818,201, filed Jun. 18, 2010.

* cited by examiner

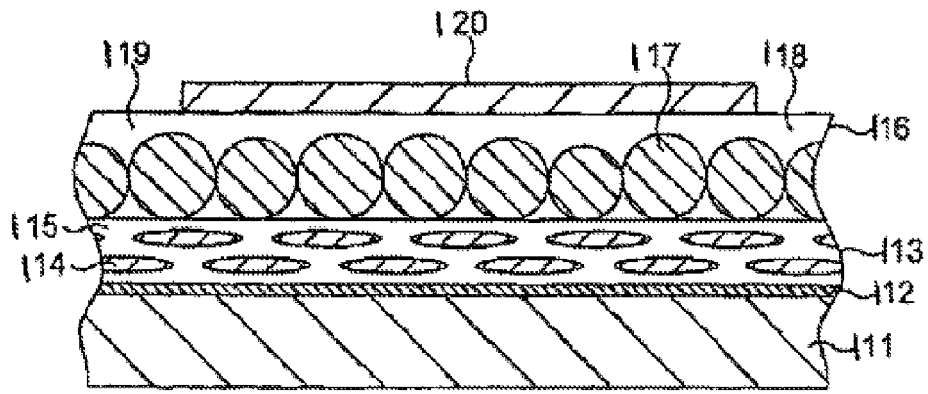

FIG. 4

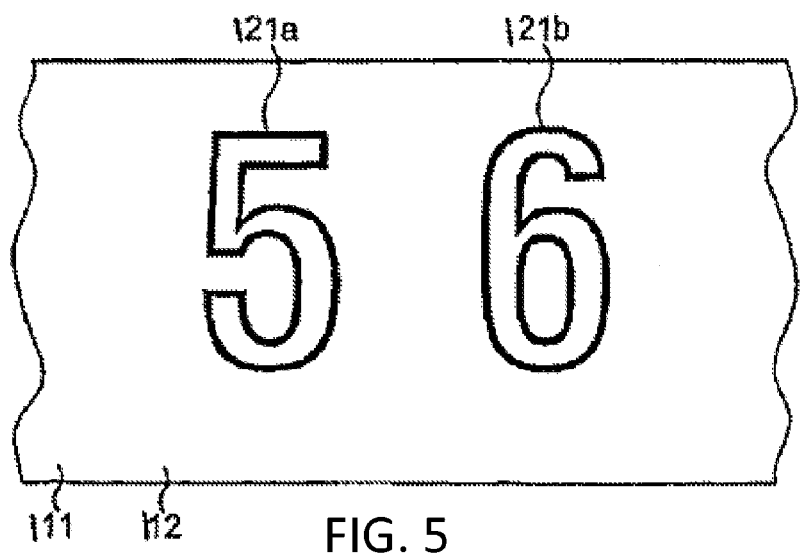

FIG. 5

| Barrier Polymer | Level of LC migration | Electro-optic characterisation |
|---|---|---|
| Celvol 205 PVA | No migration observed | Performance maintained |
| LuxPrint 285 | Medium level of migration | Decrease in performance |
| Diofan B200 PVDC | High level of migration | Decrease in performance |
| Celvol 205/EAA (9:1) | Low level of migration | Slight decrease in performance |
| Celvol 205/EAA (3:1) | Medium level of migration | Decrease in performance |

FIG. 6

ELECTROLUMINESCENT DISPLAYS

RELATED APPLICATIONS

The present application is a continuation-in-part of U.S. Ser. No. 11/570,976, filed on Jun. 10, 2005, entitled "Electroluminescent Display", based upon PCT/GB2005/002298. This application also claims priority to GB 0413121.5, filed on Jun. 11, 2004 and GB 0805751.5, filed on Mar. 29, 2008.

TECHNICAL FIELD

This invention is concerned with displays, and relates in particular to electroluminescent displays, and more specifically to displays which are electroluminescent/liquid crystal hybrids.

BACKGROUND OF THE INVENTION

Certain materials are electroluminescent—that is, they emit light, and so glow, when an electric field is generated across them. The first known electroluminescent materials were inorganic particulate substances such as zinc sulphide, while more recently-found electroluminescent materials include a number of small-molecule organic emitters known as organic light emitting diodes (OLEDs) and some plastics—synthetic organic polymeric substances—known as light-emitting polymers (LEPs). Inorganic particulates, in a doped and encapsulated form, are still in use, particularly when mixed into a binder and applied to a substrate surface as a relatively thick layer; LEPs can be used both as particulate materials in a binder matrix or, with some advantages, on their own as a relatively thin continuous film.

This electroluminescent effect has been used in the construction of displays. In some types of these a large area of an electroluminescent (EL) material—generally referred to in this context as a phosphor—is provided to form a backlight which can be seen through a mask that defines whatever characters the display is to show. In other types there are instead individual small areas of EL material. Displays of either of these types have many applications; examples are a simple digital time and date display (to be used in a watch or clock), a mobile phone display, the control panel of a household device (such as a dishwasher or washing machine), and a handheld remote controller (for a television, video or DVD player, a digibox, stereo or music centre or similar entertainment device).

As noted above, the electroluminescent effect can be used to make a backlight that can shine through a mask defining a display. From front (the side from which, it is to be viewed) to back such a backlight commonly consists of:
- a relatively thick protective electrically-insulating transparent front layer known as the substrate and made usually of a glass or a plastic such as polyethylene terephthalate (PET) or polyethylene naphthalate (PEN);
- over the entire rear face of the substrate, a relatively thin transparent electrically-conductive film made from a material such as indium tin oxide (ITO), this forming one electrode—the front electrode—of the backlight;
- covering the rear face of the front electrode, a relatively thin layer of electroluminescent phosphor material (usually a particulate phosphor within a binder matrix);
- over the rear face of the phosphor layer, a relatively thin electrically-insulating layer of a material—usually a ceramic—having a relatively high dielectric constant (relative permittivity) of around 50 (in some applications, such as the present invention, this layer is most desirably significantly optically-reflective, while in others it preferably has low reflectivity);
- covering the entire rear face of the electrically-insulating layer, a continuous electrically-conductive film, usually opaque (and typically carbon or silver), forming the other electrode—the back electrode—of the backlight.

In addition, the back electrode layer, which is quite delicate, is generally covered with a protective film (in some applications this is usually another, similar, ceramic layer, whereas in others—and in the present one—it is preferably a flexible polymeric material) to prevent the layer being damaged by contact with whatever device components—electronic circuitry, for example—might be mounted behind the display.

A number of techniques known to those skilled in the art may be used to construct such a device. However, each of the various layers is preferably screen-printed into place (apart from the ITO front electrode, which is usually sputtered onto the substrate), through masks that define the shape, size and position of the layer components, using suitable pastes that are subsequently dried, set or cured, commonly through the application of heat or ultraviolet light, as appropriate, prior to the next layer or collection of layers being applied. And in the context of electroluminescent displays, the expressions "relatively thick" and "relatively thin" mean thicknesses in the ranges, respectively, of 30 to 300 micrometres, usually around 100 micrometres, and 50 micrometres, and most usually 25 micrometres or less.

In a display, such a backlight is generally positioned behind a mask. Typically, such a mask is permanent—that is containing fixed, predefined, transmitting and blocking areas. The switching of such a display is controlled by turning the backlight, or sections thereof, on or off.

International patent application No: WO 2005/0121878, which is incorporated herein by reference, describes an electroluminescent display (Hybrid Display) with a Liquid Crystal (LC) mask that is switchable in individual areas, between "on"/transparent (so that the backlight can shine therethrough) and "off"/opaque (so that the backlight's light is blocked thereby). The LC mask and the EL backlight are formed as a single integral unit wherein both components (the LC mask and EL backlight) are operated using common electrodes—the EL backlight being created as an electroluminescent material layer mounted directly on the rear of or behind the layer of liquid crystal material.

It will be appreciated that it is essential that the LC material be in a physically-stabilised form rather than in the normal "liquid", mobile, form implied by its name.

The inventor has realised that a polymer dispersed liquid crystal (PDLC) film consisting of droplets of liquid crystal, typically nematic or cholestic in nature, dispersed in a polymer matrix (binder) is suitable for the LC mask of such a hybrid display.

By including a dichroic dye in the PDLC, the unpowered state can be strongly absorbing as well as scattering, whilst the powered state combines transparency with low absorption. This type of PDLC is known as NCAP (entrapped nematic curvilinear aligned phase) and the inventor has found the NCAP type of PDLC to be particularly suitable for use as the LC material in the hybrid display. In particular, NCAP PDLCs minimise dye migration into the binder, and so do not degrade the achievable contrast.

These films can be constructed using an emulsification method, or by using one of a number of phase separation techniques. The emulsification method uses mechanical shear to disperse dyed liquid crystal organic oil into an aqueous-based medium comprising a water-soluble polymer, for example polyvinyl alcohol (PVA), which is to form the polymer matrix.

The formation of the display can be achieved by a number of methods. WO 2005/0121878 discloses a method wherein each of the various layers is screen-printed into place (apart from the ITO front electrode, which is usually sputtered onto the substrate), through masks that define the shape, size and position of each layer of the display, using suitable pastes that are subsequently dried, set or cured, as appropriate, prior to the next layer or collection of layers being applied.

The inventor has found that using an NCAP PDLC material with PVA as a binder is unsatisfactory because, even though the PVA is an excellent binder, providing very stable emulsions, it absorbs water readily from the atmosphere, which in turn degrades the electro-optic performance of the PDLC through water dependent leakage currents. Accordingly, displays manufactured using PVA as a binder in the LC layer have poor environmental stability, which can result in defects, such as spotting of the display.

International Patent Application, publication No: WO2008075001, which is also incorporated herein by reference, proposes a solution to this problem wherein the PDLC layer comprises UV curable polyurethane. A display having such a PDLC layer may have increased environmental stability and improved electro-optical behaviour.

It has been found that hybrid displays comprising a PDLC layer fade when exposed to elevated temperatures, such as 50 or 60° C. This fading has been observed as an increase in the reflectivity of the display, particular in non-illuminated areas of the display. This increase in reflectivity decreases the contrast between the illuminated and non-illuminated areas of the display and hence reduces legibility of the display. It has also been observed that the print quality of the phosphor layer printed onto the PDLC is lower than a phosphor layer printed onto an ITO layer.

Investigation has showed that the fading is not caused by degradation of the dye used to colour the liquid crystal but by migration of the dye and liquid crystal out of the PDLC layer, through the EL layer, to an insulator layer used as a capping layer on the rear of the display. This insulator layer becomes coloured as a result of the migration of the dye. Fourier Transform Infrared Spectroscopy (FTIR) has been used to demonstrate the presence of liquid crystal in the insulator layer of a test lamp that had been aged at 85° C. for approximately 18 hrs.

BACKGROUND OF THE INVENTION

This invention provides, in a first aspect, an electroluminescent display of the type having a switchable electroluminescent (EL) material backlight mounted behind a mask defining the information to be displayed, in which display:
  the mask is constructed as a layer of physically-stabilised Liquid Crystal (LC) material switchable to define the information to be displayed; and
  the LC mask and the EL backlight are constructed as a single entity, the latter created as a layer mounted directly on/behind the layer of LC material.

The present invention essentially combines the two approaches of a mask and of individual small lit areas; as is explained in more detail hereinafter it proposes a display which is a combination of a liquid crystal (LC) possessing specific properties, which can be used to define a mask, selectable areas of which can be switched between transparent and opaque at will, together with an EL backlight which, unlike most backlights, is only activated (to emit light) under those areas of the LC mask which are at the time transparent.

Such a display—a combination of LC material and EL material—is for convenience referred to hereinafter as a "hybrid" display. It may be more specifically defined as one where a single substrate is used to carry firstly a layer of physically-stabilised LC material switchable to form a mask defining the information to be displayed, and secondly—and formed directly on the LC layer and viewable therethrough—an EL material layer switchable to act as a backlight for the display.

What the present invention proposes is that the mask itself should be switchable in individual areas, between "on"/transparent (so that the backlight can shine therethrough) and "off"/opaque (so that the backlight's light is blocked thereby). Moreover, the invention proposes that this switchable mask should be an LCD—Liquid Crystal Display—device that can be made transparent or opaque in the manner described. Furthermore, it is proposed that the LCD mask and the EL backlight be made as a hybrid—as a single entity made of both components supported one behind the other on a single substrate—the EL backlight being created as an electroluminescent material layer mounted directly on/behind the layer of LC material; from this it will be understood that it is essential that the LC material be in a physically-stabilised form rather than in the normal "liquid", mobile, form implied by its name.

In a second aspect of the invention there is provided an electroluminescent display of the type having a switchable electroluminescent (EL) material backlight mounted behind a mask defining the information to be displayed, in which display:
  the mask is constructed as a layer of physically-stabilised Liquid Crystal (LC) material switchable to define the information to be displayed; and
  the LC mask and the EL backlight are constructed as a single entity.

While the LC mask can be created as a layer mounted directly on/behind the layer of LC material, it is possible to provide an insulating interlayer, typically comprising an insulating polymer, provided between the LC mask and EL backlight.

The interlayer is preferably substantially optically transparent, at least to those wavelengths of light emitted by the EL material, and is preferably electrically insulating. This "tie" layer serves, if necessary, to provide increased cohesion between the two portions of the display. An additional benefit of this layer is, through control of its thickness, to adjust the voltage provided to the LC and EL materials and so optimise the overall performance of the display; the relative thickness of the layers of EL, LC and interlayer materials and their relative dielectric constants will control how much voltage is dropped across each layer.

The optional features that follow may be applied equally well to either of the first or second aspects of the invention, except where the context requires otherwise. In the case of either aspect, we have appreciated that EL and LC materials can be formed and driven together and as such the present display is both convenient to fabricate and to operate.

Furthermore, only the area of EL material behind a portion of LC material that is transmissive to light need be illuminated; this typically reduces the amount of EL material that requires illumination at any given time and as such can reduce the energy consumption of the display.

Using the same language as employed hereinabove to describe the structure of a conventional EL backlight, the structure of the hybrid display of the invention may—in a preferred aspect, at least—be similarly described from front to back as:

- a relatively thick protective electrically-insulating transparent front layer (the substrate);
- over at least part of the rear face of the substrate, possibly in an area-defining pattern, a relatively thin transparent electrically-conductive film forming one electrode(s)—the front electrode—of the display;
- covering at least partially the rear face of the front electrode, a relatively thin layer of physically-stabilised liquid crystal material, this being switchable (between transmissive and opaque) to form the mask defining the information to be displayed;
- optionally, formed directly on, and covering at least part of the rear face of, the liquid crystal layer a relatively thin optically transparent, electrically insulating layer to provide an interface between the two 'active' sections of the construction.
- formed directly on, and covering at least part of the rear face of, the insulating layer, or if this layer is not present directly on, and covering the rear face of the liquid crystal layer, a relatively thin layer of electroluminescent/phosphor material;
- over the rear face of the phosphor layer, a relatively thin optically—reflective electrically-insulating layer of a relatively high dielectric constant material; and
- disposed over at least part of the rear face of the reflective electrically-insulating layer, an electrically-conductive film (possibly in an area-defining pattern) forming the other electrode(s) of the display;
- the front and rear electrodes together defining which areas of both the liquid crystal layer and the electroluminescent layer can be selected to be switched "on" or "off".

In addition, the back electrode layer may be covered with a protective film.

The hybrid display of the invention may be for any purpose; a list of some purposes is given hereinabove by way of example.

Other than the fact of its mounting directly on the LC material mask, the display's electroluminescent (EL) backlight can be made in any appropriate way, and of any suitable materials. This is well known in the Art, is discussed generally hereinabove, and needs no further comment here. Even so it is probably worth making the following comments, which describe the most preferable embodiment.

The particulate phosphor used as the EL material can be an LEP in particulate form, but most preferably it is an inorganic material; a typical inorganic particulate phosphor is zinc sulphide, especially in the form of encapsulated particles (encapsulation provides substantially-increased stability and life).

Especially convenient zinc sulphide materials of this type are the Luxprint range of phosphors manufactured by DuPont or the Electralux product range manufactured by Electra Polymers and Chemicals Ltd. Typically a phosphor paste such as DuPont 8154B (High Bright Green) or Electra Electralux ELX-10 is applied to an ITO coated PET substrate and dried to give a layer approximately 25 micrometer thick.

As in the Art, the phosphor layer is covered or subsequently overprinted with an insulating layer (in the present invention this is desirably formed of an optically-reflective ceramic material). Such materials are available from a number of commercial suppliers and may be either thermally or UV cured. Typical materials that may be used comprise Dupont Luxprint 8153 (a thermally curable dielectric paste), DuPont Luxprint 5018 (a UV curable paste) and Electra Electralux ELX 80 (a thermally curable paste) and are applied as a layer around 10 to 15 micrometres thick.

Back electrodes are then formed on this insulating layer, by the deposition of a conducting ink or paste such as DuPont Luxprint 9145 (a thermally curable silver pigmented paste), Norcote ELG110 (a UV curable silver paste) or Electra Electralux ELX30 (a thermally curable silver paste) as a relatively thin layer—around 20 micrometre—where required.

Finally, the rear face of the display may then be protected with a thin—15 micrometre—ceramic insulating layer. Materials that may be used to fabricate this layer include DuPont 5018, as above, Coates UV600G UV Curable Coverlay or Electra Electralux ELX40.

In the "hybrid" display of the current invention the information-defining mask is constructed as a layer of physically-stabilised Liquid Crystal (LC) material that can be switched to transmit or block light output by the backlight as required. Though notionally the LC material might be any one of the main types of such material—such as twisted nematic and cholesteric or chiral nematic—the requirement is, generally, for a liquid-crystal-based material that allows polariserless high contrast electro-optical shuttering operation between a field "on" state that is fully transmissive and a base field "off" state that is optically non-transmissive through absorption, reflection and/or scattering processes. Chiral nematic materials seem particularly appropriate; as now explained, they have special properties which are extremely well suited to the purpose of the invention. Thus, relatively-recent developments in Liquid Crystal technology have produced materials (such as Nematic Curvilinear Aligned Phase liquid crystals as manufactured by Raychem under the trade name NCAP or Dyed Chiral Nematic liquid crystals) which can act as an optical shutter; in one state they absorb incident light, while in another state they transmit it.

Using such a material, the combination of a liquid crystal shutter in front of an electroluminescent display results in a hybrid display which not only emits light when activated but also changes reflectivity when activated. This type of hybrid display can have good visibility in a very large range of lighting conditions—from pitch darkness to full sunlight (typically considered the highest ambient light condition).

There is another significant advantage related to chiral nematic materials: selection of a liquid crystal material which absorbs light in the absence of an electric field and transmits light when an electric field is present allows the same electric field to be used to drive the electroluminescent material as is used to drive the liquid crystal material. In the absence of an electric field, the liquid crystal material absorbs incident ambient light and the electroluminescent material does not generate any light so the display element appears dark. When an electric field is applied, the liquid crystal transmits both incident ambient light, which subsequently reflects back out off the electroluminescent layer behind it, and also the light now generated by the electroluminescent layer, so the display appears light.

Accordingly, the LC and EL materials may be controlled by a common pair of electrodes. This is particularly convenient due to its simplicity.

Liquid crystal shutter materials change state (from absorptive to transmissive) on the application of an AC electric field of the order of 1-1 OkV/mm. Thick film electroluminescent materials emit light on the application of similar electric fields. It is possible, therefore, to connect the two display elements in series such that they effectively share the applied electric field. This series connection of the display elements can most conveniently be accomplished by applying a first layer of liquid crystal material to a transparent conductive substrate (such as ITO-coated PET or PEN) followed by a layer of electroluminescent material over the rear surface of the liquid crystal. It is desirable that the resultant display be flexible and pressure insensitive as is the case with a thick film electroluminescent display.

To this end, in the hybrid display of the invention the information-defining mask is constructed as a layer of physically-stabilised Liquid Crystal (LC) material—conveniently the liquid crystal material is dispersed or stabilised within a matrix structure that holds it in place. Such a stabilised liquid crystal is commonly referred to as a polymer-dispersed liquid crystal (PDLC) or as a polymer-stabilised liquid crystal (PSLC). A broad range of polymer materials is available for this purpose. One appropriate material is gelatine; the liquid crystal material can be combined with the gelatine, with appropriate solvents and additives, to produce a stable emulsion which can then be coated or screen-printed onto the (ITO-coated) substrate and subsequently dried. The electroluminescent phosphor material can then be applied to the reverse of the dried PDLC layer, followed by the other layers as described above.

Other materials, compatible with a number of polymer materials (such as Merck MXMO35 or SAM114), can be used to create composite self-sustaining films suitable for typical print-production processes. The sustaining matrix may be created such that the liquid crystal is in a continuous phase (a Polymer Stabilised Liquid Crystal—PSLC—Kent Displays Incorporated) or the liquid crystal may be encapsulated in distinct droplets as in a polymer-dispersed device (a Polymer Dispersed Liquid Crystal—PDLC—XymoxNCAP, mentioned above).

Applied directly (conveniently by screen printing) to the LC layer is the phosphor of the EL layer and a reflective layer and a rear conductive layer are then sequentially applied on top of this phosphor layer, again conveniently using screen printing. The reflective layer can be produced using a high dielectric constant ceramic, such as barium-titanate-loaded ink. The rear conductor layer can be a silver- or carbon-loaded ink. It is also possible to combine the functions of the reflective and conducting layers by the use of a single silver loaded ink layer.

For the most part, a hybrid display of the invention most conveniently incorporates disposed over substantially the entire rear face of the substrate a single (front) electrode, and disposed over the rear face of the reflective electrically-insulating layer a patterned (rear) defining which areas of both the liquid crystal layer and the electroluminescent layer can be selected to be switched "on" or "off". However, it is possible as an alternative to pattern the front electrode and to have a single "whole-face" rear electrode. Moreover, it is possible for both electrodes to be patterned—as will need be the case if the display is going to be a matrix device where a multitude of very small areas can be illuminated at will so as to enable almost any shape and size of displayed image simply by selecting which areas are lit and which are dark.

The hybrid display of the invention incorporates a layer of switchable LC material to act as a mask in front of an EL material layer switchable to act as a backlight for the display. The switching is effected by control voltages applied to the electrodes positioned to the front and rear—the relatively thin transparent electrically-conductive film over the entire rear face of the substrate forming the front electrode, and the pattern of areas of electrically-conductive film disposed over the rear face of the reflective electrically-insulating layer forming the rear electrode(s). This one "pair" of front/back electrodes is used to switch both the LC material (from opaque to transparent, and back) and the EL material (from off/dark to on/light-emitting). Moreover, unlike in a more conventional EL backlight, where the EL layer is over its entire surface either "on" or "off" (light-emitting or dark), in the hybrid display the EL material is only switched "on" behind those LC material areas which are themselves switched "on" (transparent). This partial activation of the EL layer results in a significant power saving.

The relative thicknesses and dielectric constants of the LC material and—electroluminescent material layers, and the insulating interlayer if used will determine how much of the total applied field (the voltage between the front and rear electrodes) appears across these respective layers. Their thickness can therefore be controlled to optimize display contrast ratio in various lighting conditions, and to minimise power consumption. Typically, a 5-10 micrometre layer of an LC material such as PDLC will be used in combination with a 20-40 micrometre electroluminescent material layer.

In the invention's hybrid display the EL material is applied directly to the rear of the LC material layer (with the possible inclusion of the interlayer discussed above), the combination being born by a single substrate with a single "pair" of activation electrodes. This single substrate display construction has significant advantages over other combinations of a light-emitting layer with a shutter layer. In particular, as the same electronic drive circuitry can most conveniently be used to power both the light-emitting EL layer and the mask-defining LC shutter layer the cost of the whole is substantially reduced over that of normal transflective LCD displays requiring a separate backlight. And, as noted above, for a segmented or matrix-style display, only the segments required to be of a light appearance are powered, whereas typically in a transflective LCD with a separate backlight the entire area of the display is lit at all times by the backlight with the LCD shutter blocking or transmitting light as appropriate. For the invention's hybrid, then, the result is improved contrast and reduced power consumption over these other displays.

According to another aspect of the invention there is provided an electroluminescent display comprising a mask defining the information to be displayed, an electroluminescent (EL) backlight, the mask comprising a layer of physically stabilised liquid crystal switchable to define the information to the displayed mounted in front of an EL layer of the backlight, at least one pair of electrodes arranged to generate, in use, an electric field across both the EL layer and the LC layer and a barrier layer between the mask and the EL layer that restricts migration of liquid crystal from the mask to the EL layer.

The barrier layer reduces, or even prevents, the migration of liquid crystal from the liquid crystal layer to the EL layer reducing or even eliminating fading of the display.

According to a further aspect of the invention there is provided a method of manufacturing a display comprising forming a mask defining the information to be displayed, the mask comprising a layer of physically stabilised liquid crystal, forming a barrier layer, forming an EL layer of a backlight with the liquid crystal layer mounted in front of the EL layer and forming at least one pair of electrodes arranged to generate, in use, an electric field across both the EL layer and the LC layer, wherein the barrier layer restricts migration of liquid crystal from the liquid crystal to the EL layer, It will be understood that "front" as used herein means the side of the display from which the display is to be viewed.

The liquid crystal layer is in a physically stabilised form rather than its normal liquid mobile form, for example the liquid crystal may be liquid crystal vesicles encapsulated in a polymer matrix, such as a polymer-dispersed liquid crystal (PDLC), or a polymer stabilised liquid crystal (PSLC).

Layers forming the backlight may be printed directly on the barrier layer. Alternatively, layers of the EL backlight may be formed at a unit separate (i.e. remote) from the LC layer and the barrier layer, which is then adhered to the rear of the barrier layer.

The barrier layer may be arranged to limit the migration of liquid crystal from the LC layer to layers behind the mask such that no significant fading of the display occurs due to migration of the liquid crystal under pre-determined criteria. It will be understood that the term "significant fading" is used herein to mean changes in contrast of the display that are noticeable to the naked eye, The barrier layer may be arranged to limit the migration of liquid crystal from the LC layer to layers behind the mask such that, when the display is heated to 85 degrees over 18 hours, there is virtually no change, and preferably no change whatsoever, in contrast between illuminated and non-illuminated areas of the display.

The EL material backlight may comprise an insulating layer behind a layer of electroluminescent material.

The barrier layer may comprise a material in which the liquid crystal has low solubility. As liquid crystal particles in the LC layer cannot dissolve in the barrier layer, migration of liquid crystal through the barrier layer to the EL backlight is reduced or even eliminated.

The barrier layer may comprise a material in which the liquid crystal has solubility lower than the solubility of liquid crystal in phosphor. In particular, the barrier layer may comprise material in which the liquid crystal has a low enough solubility such that no significant fading of layers behind the LC layer occurs due to migration of the liquid crystal under pre-determined criteria, for example, no significant fading of the layers behind the LC layer occurs due to migration of the liquid crystal when the display is heated at a set temperature for a set time, for example 85° C. for approximately 18 hrs.

Solubility can be measured as the maximum amount of solute that can dissolve per amount of solvent under specified conditions. The barrier layer may comprise a material in which the liquid crystal has substantially zero, and preferably zero, solubility at room temperature and atmospheric pressure.

The barrier layer may comprise a hydrophilic layer, in particular a hydrophilic polymer. The polymer may be a water soluble polymer, such as polyvinyl alcohol, polyvinyl alcohol copolymer, such as ethylene vinyl alcohol polymer, polyvinyl butyral, gelatine and its derivatives, cellulose derivatives polyacrylics and derived polymers and polyacrylic acids and derived polymers. Alternatively, the polymer may be a non-water soluble polymer that can be carried in an emulsion and/or dispersion, such as polyurethanes, polyethylene-acrylic acid copolymer and derived copolymers, polymethacrylics and derived copolymers and polymethacrylic acids and derived copolymers.

In another embodiment, the polymer may be a hydrophobic polymer, such as polyvinylidenefluorude, polyamides, polysiloxanes, polyvinyl esters. Preferably, the polymer is a polyvinyl alcohol (PVA).

Preferably, the polymer is a polyvinyl alcohol (PVA), or a polyvinyl alcohol copolymer such as an ethylene vinyl alcohol copolymer. Preferably the polyvinyl alcohol or polyvinyl alcohol copolymer has a degree of hydrolysis of between 72% and 99%. When the polymer is ethylene vinyl alcohol copolymer has degree of hydrolysis between 75% and 99%, and/or an ethylene content of less than 51%. The ethylene content may be between 5 and 57%. It has been found that PVA and polyvinyl alcohol copolymers are suitable for use as the barrier layer because liquid crystal has low solubility in this material and the material has the required level of hydrophilicity to function as desired.

Furthermore, the barrier layer may comprise a polymer in which the liquid crystal has low solubility and a further polymer to improve the adhesion of the barrier layer with the LC layer and/or the EL layer.

When a hydrophilic barrier layer absorbs water it increases its electrical conductivity (reduces its resistivity) such that the electrical characteristics of the display may be similar to such a display without the barrier layer. For example, a completely dry hydrophilic polymer layer may have a resistance of about $10^{10}$ Ωcm, whereas, after absorbing water from the environment, its resistivity may reduce to $10^6$ or even $10^5$ Ωcm. In this way, the introduction of a hydrophilic barrier layer has little, or even no, impact on the electrical characteristics of the display, but acts to prevent migration of the liquid crystal.

The polymer matrix of the liquid crystal layer may be any one of water based, monomer free radiation curable urethane oligomer dispersions; acrylic functional polyurethane dispersions and acrylic urethane emulsions. In the most preferred embodiment, the polymer matrix is a UV curable polymer matrix, for example a UV curable aliphatic polyurethane resin, such as those supplied by DSM Neoresin under the trade names NeoRez® R440, R440, R445, R401 and R501. However, it is believed that the matrix may comprise other film forming UV curable polymers, for example, UV curable polyurethane dispersions (known in the art as UV-PUD), acrylic dispersions, silicones and mixtures therefore. The matrix resin can be formed from an aqueous solution or emulsion that contains very low levels, and preferably no, co-solvent.

Preferably, the polymer matrix comprises substantially no PVA. The term "substantially no PVA", means the polymer matrix comprises less than 5% PVA, preferably less than 1% PVA and most preferably, no PVA.

A number of different component materials could be used to form a shell of the vesicles. One example of a pair of component materials that may be used for the shell is a multifunctional iscocyanate (e.g. Desmodur N3200—sold by Bayer) and a diamine, such as ethylene diamine. The reaction may be catalysed by a tertiary amine, such as DABCO.

Notionally, the liquid crystal may be any one of the main types such material—such as nematic and cholesteric or chiral nematic—the requirement is, generally, for a liquid crystal based material that allows polariserless high contrast electro-optical shuttering operation between a field "on" state that is optically transmissive and a base field "off" state that us less transmissive than the "on" state.

Preferably, the liquid crystal contains a dye. In one arrangement, the liquid crystal includes up to 6% by weight of a dye, preferably a dichroic dye. In a preferred arrangement, levels of dye in the liquid crystal are 3-5% by weight. The dye attaches to the liquid crystal molecules and acts to obscure light when no field is applied across the liquid crystal but when a field is applied, the dye molecules are aligned for allowing the transmission of light. As the dye is attached to the liquid crystal, the barrier layer limits the migration of both the liquid crystal and dye to layers behind the liquid crystal layer.

The LC mask and the EL backlight may be constructed as a single entity. By this, it is meant that the LC mask is adhered to the EL backlight or sandwiched between layers of the display to be immovable with respect to the backlight.

From the front to back the backlight comprises:
- an electrically-insulating transparent front layer known as the substrate, usually made of glass or plastic, such as polyethylene terephthalate (PET) or polyethylene naphthalate (PEN);
- a first electrically-conductive film, for example, made from a material such as indium tin oxide (ITO), forming one electrode—the front electrode—of the backlight;
- the electroluminescent (EL) layer (usually a particulate phosphor within a binder matrix);
- an electrically-insulating layer of a material—usually a ceramic—having a relatively high dielectric constant (relative permittivity) of around 50 (in some applications, such as the present invention, this layer is most desirably significantly optically-reflective, while in others it preferably has low reflectivity); and
- disposed over the rear face of the electrically-insulating layer, an electrically conductive film forming a second electrode-conductive film forming a second electrode—the rear electrode—of the backlight.

The display of the invention may incorporate disposed over the entire rear face of the substrate a single (front) electrode, and disposed over the rear face of the reflective electrically-insulating layer a patterned (rear) electrode defining areas of both the liquid crystal layer and the electroluminescent layer that can be selected to be switched "on" or "off". However, it is possible as an alternative to pattern the front electrode and to have a single "whole-face" rear electrode. Moreover, it is possible for both electrodes to be patterned—as will need be the case if the display is going to be a matrix device where a multitude of very small areas can be illuminated at will so as to enable almost any shape and size of displayed image simply by selecting which areas are lit and which are dark.

According to yet another aspect of the invention there is provided a method of reducing fading of an electroluminescent display comprising a mask defining the information to be displayed, an electroluminescent (EL) backlight, the mask comprising a layer of physically-stabilised liquid crystal mounted in front of an EL layer of the backlight, and at least one pair of electrodes arranged to generate, in use, an electric field across both the EL layer and the LC layer, the method comprising providing a barrier layer between the LC layer and the EL layer that restricts migration of liquid crystal from the LC layer to the EL layer.

The method may comprise identifying a material that, when used as a barrier layer, limits the migration of liquid crystal from the LC layer to layers behind the LC layer such that no significant fading of the display occurs due to migration of the liquid crystal and using the identified material for the barrier layer.

According to a further aspect of the invention there is provided a method of determining a material suitable for use as a barrier layer in an electroluminescent display comprising forming a layered structure comprising a physically-stabilised liquid crystal (LC) layer mounted in front of a test layer and a layer of material between the LC layer and the test layer that has potential as the material of the barrier layer, heating the layered structure to a predetermined temperature for a predetermined length of time, examining the test layer for liquid crystal migration, and determining whether the material is suitable for use as a barrier layer based on whether there is liquid crystal migration.

The layered structure may comprise a display comprising a mask defining the information to be displayed and an electroluminescent (EL) backlight, the mask comprising a layer of physically-stabilised liquid crystal (LC) mounted in front of an EL layer of the backlight, at least one pair of electrodes arranged to generate, in use, an electric field across both the EL layer and the LC layer and the layer of material that has potential as the material of the barrier layer being between the LC layer and the test layer mounted behind the EL.

The test layer may be of a material in which liquid crystal is soluble and may be an insulator.

The material may be deemed as suitable for use as a barrier layer if there are no visible signs of liquid crystal in the test layer.

According to a further aspect of the invention there is provided a method of manufacturing an electroluminescent display comprising forming a mask defining the information to be displayed, the mask comprising a layer of physically stabilised liquid, forming a barrier layer, forming an EL layer of a backlight with the LC layer mounted in front of the EL layer and forming at least one pair of electrodes arranged to generate, in use, an electric field across both the EL layer and the LC layer, wherein the barrier layer is made of material identified as suitable for use as a barrier layer in accordance with the fourth aspect of the invention.

According to another aspect of the invention there is provided an electroluminescent display comprising a mask defining the information to be displayed, an electroluminescent (EL) backlight, the mask comprising a layer of physically-stabilised liquid crystal switchable to define the information to the displayed mounted in front of an EL layer of the backlight, at least one pair of electrodes arranged to generate, in use, an electric field across both the EL layer and the LC layer and a barrier layer between the mask and the EL layer, wherein the barrier layer is made of material identified as suitable for use as a barrier layer in accordance with the fourth aspect of the invention.

These and other features of the present application will become apparent to one of ordinary skill in the art upon review of the following detailed description when taken in conjunction with the drawings and the appended claims.

BRIEF DESCRIPTION OF THE DRAWINGS

Embodiments of the invention are now described, though by way of illustration only, with reference to the accompanying diagrammatic Drawings in which:

FIG. 4 shows a section through a display according to another embodiment of the invention;

FIG. 5 shows the display of FIG. 4 in plan view; and

FIG. 6 is a table illustrating the suitability of different materials as a barrier layer.

DETAILED DESCRIPTION OF THE INVENTION

Figure 1:
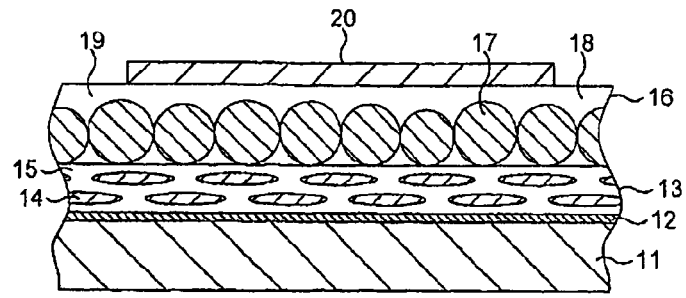
FIG. 1 shows a section through a hybrid LC/EL display according to a first embodiment of the invention.

The structure of the first embodiment of the display of the invention depicted in FIG. 1 of the accompanying drawings can be seen to be, from front to back:
- a relatively thick protective electrically-insulating transparent front layer (11; the substrate;
- over the rear face of the substrate 11, a relatively thin transparent electrically-conductive film (12) forming the front electrode of the display;
- covering the rear face of the front electrode 12, a relatively thin layer (13) of LC material (14) physically-stabilised by being dispersed within a supporting matrix (15);

formed directly on, and covering the rear face of, the liquid crystal layer 13, a relatively thin layer (16) of electroluminescent/phosphor material (17) dispersed within a supporting matrix (18);

over the rear face of the phosphor layer 16, a relatively thin optically-reflective electrically-insulating layer (19) of a relatively high dielectric constant material (in the Figure this layer is shown as a seamless extension of the phosphor layer 16); and disposed over the rear face of the reflective electrically-insulating layer 19, an electrically-conductive film (20) forming the rear electrode(s) of the display.

The front and rear electrodes together define which areas of both the liquid crystal layer and the electroluminescent layer can be selected to be switched "on" or "off".

In addition, the back electrode layer may be covered with a protective film (not shown here).

Figure 2:
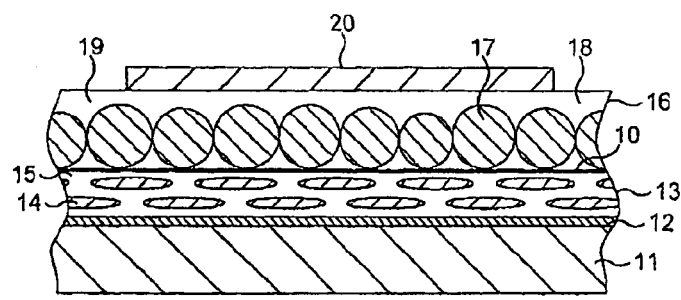
FIG. 2 shows a section through a hybrid LC/EL display according to a second embodiment of the invention.

In an alternative embodiment shown in FIG. 2 of the accompanying drawings, the EL and LC materials are not directly formed on one another, 10 but are instead separated by an insulating interlayer. In all other aspects, the embodiments are the same and common reference numerals have been used.

Figure 3:
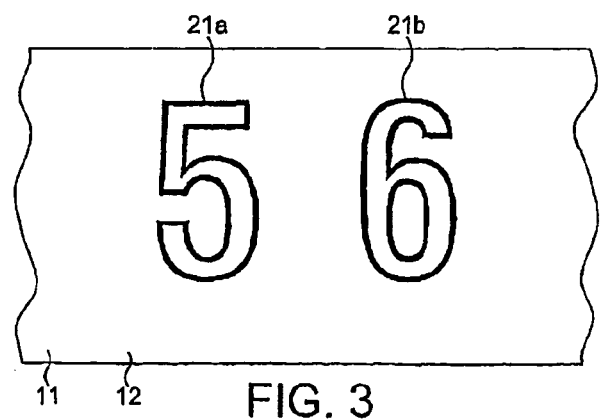
FIG. 3 shows a hybrid LC/EL display according to either embodiment, in plan view.

In either case with or without the interlayer 10, the EL and LC materials can share the common pair of electrodes 12, 20 for common activation of the EL and LC materials. This can be used to generate a display of selectively illuminatable indicia as show schematically in FIG. 3 of the accompanying drawings. This shows how a common front electrode 12 and substrate can support multiple indicia 21a, 21b. Each indicium 21a, 21b comprises the remaining layers of the structure shown in FIG. 1 or FIG. 2 or the accompanying drawings, namely the LC layer 13, optionally the interlayer 10, the EL layer 17, the reflective insulating layer 18 and the rear electrode 20. These layers are shaped to provide selectively illuminatable elements that can be illuminated to provide indications to a user; in the present example these are the numbers "5" and "6" but could be extended to any indicia.

In addition, there is provided:—

The structure of the embodiment of the display of the invention depicted in FIG. 4 of the accompanying drawings can be seen to be, from front to back:

a relatively thick protective electrically-insulating transparent front layer (111; the substrate);

over the rear face of the substrate 111, a very thin transparent electrically-conductive film (112) forming the front electrode of the display;

covering the rear face of the front electrode 112, a relatively thin layer (113) of LC material (114) physically-stabilised by being dispersed within a supporting polymer matrix (115) (PDLC layer);

formed directly on, and covering the rear face of the liquid crystal layer (113), a relatively thin barrier layer (110) of PVA that restricts migration of liquid crystal from the PDLC layer (113) to layers (116, 119, 120) to the rear of the LC layer;

a relatively thin layer of electroluminescent/phosphor material (117) dispersed within a supporting matrix (118);

over the rear face of the phosphor layer (116), a relatively thin optically-reflective electrically-insulating layer (119) of a relatively high dielectric constant material (in the Figure this layer is shown as a seamless extension of the phosphor layer (116); and disposed over the rear face of the reflective electrically-insulating layer (119), an electrically-conductive film (120) forming the rear electrode(s) of the display.

The front and rear electrodes together define discrete areas of both the liquid crystal layer and the electroluminescent layer that can be selected to be switched "on" or "off". In this way, the LC layer defines a mask defining the information to be displayed and the EL layer a backlight to illuminate the areas defined by the mask.

In addition, the back electrode layer may be covered with a protective film (not shown here). The dielectric constant of the electrically insulating layer may be around 150.

The PDLC layer (113) of the display is formed in the manner described in WO2005/0121878 with liquid crystal vesicles encapsulated in a UV cured polyurethane matrix.

It will be understood that the term "relatively thick" means thicknesses in the range of 30 to 300 micrometres. Furthermore, it will be understood that the term "relatively thin" means thicknesses of 50 micrometres or less. In a preferred embodiment, the relatively thick layers are around 100 micrometres and the relatively thin layers are 25 micrometres or less.

FIG. 5 is an example of the types of information that may appear on the display.

A number of materials were evaluated as barrier layers by coating a layer of diluted polymer solution onto a sample of PDLC prepared as described in WO2008 075001. After drying the layer an EL lamp construction was printed onto the rear side of the layer of diluted polymer solution. Each display was then aged by placing the display in an oven held at 85° C. for approximately 18 to 24 hrs, at which point it was examined for visible signs of liquid crystal/dye migration. A second display having a barrier layer of each material was characterised electro-optically before and after a similar aging process.

FIG. 6 illustrates the results of these tests. As can be seen from FIG. 6, out of the materials tested, Celvol 205 PVA can be identified as particularly suitable for use as the barrier layer with Celvol 205/EAA at a ratio of 9:1 may also be suitable depending on the required electro-optical performance of the display.

Further samples of test displays prepared using PVA as a barrier layer (Mowiol 23-88) were prepared and subjected to a hot-humid aging test at 65° C./90% RH while being driven. It was found that the displays functioned after this test with a small degradation in performance. This was surprising, as it has been found previously that use of a hydrophilic polymer, such as PVA, as the polymer matrix of the PDLC layer can result in poor environmental stability.

It is envisaged that other materials, in particular, other hydrophilic polymers may be suitable for use as a barrier layer. It is believed these suitable materials can be determined by testing the material in the manner described above. The suitability of the material for the barrier layer will depend on the required performance for the display. Therefore, the temperature to which the display is heated and the time for which the display is heated during the test may be varied depending on the required performance. Materials identified as suitable for a barrier layer then can be used to manufacture a display in accordance with the invention. It is expected that suitable materials will be those in which liquid crystal has low solubility.

In some barrier layers it may also be advantageous to include a polymer to improve the adhesion of the barrier layer with the LC layer and/or the EL layer.

It will be understood that in other embodiments, separate electrodes may be used for driving the backlight and the mask.

It will be understood that it is not necessary to print a whole display in order to test the suitability of a material as a barrier layer but such a determination could be carried out by printing a layer of the material to be tested between a PDLC layer and a test layer, such as an insulator in which liquid crystal is soluble, and carrying out the above-described heat test on the resulting layered structure. If liquid crystal has migrated through to the test layer, the material is deemed inappropriate for use as a barrier layer.

It should be apparent that the foregoing relates only to the preferred embodiments of the present application and that numerous changes and modification may be made herein by one of ordinary skill in the art without departing from the general spirit and scope of the invention as defined by the following claims and the equivalents thereof.

We claim:

1. A display comprising:
   an electroluminescent layer;
   a physically stabilized liquid crystal layer, the physically stabilized liquid crystal layer being an emulsion-based physically stabilized liquid crystal layer;
   a barrier layer arranged between the electroluminescent layer and the physically stabilized liquid crystal layer to prevent migration of liquid crystal from the physically stabilized liquid crystal layer to the electroluminescent layer; and
   a first electrode and a second electrode arranged such that the electroluminescent layer and the physically stabilized liquid crystal layer are disposed between the first and second electrodes and arranged to apply an electric field across both the electroluminescent layer and the physically stabilized liquid crystal layer; wherein
   the barrier layer and either the first electrode or the second electrode that is arranged closer to the physically stabilized liquid crystal layer is optically transmissive.

2. The display according to claim 1, wherein the electroluminescent layer defines a backlight of the display.

3. The display according to claim 1, wherein the physically stabilized liquid crystal layer defines an optical shutter of the display.

4. The display according to claim 1, wherein the first electrode is a front electrode of the display and the second electrode is a back electrode of the display.

5. The display according to claim 4, further comprising a protective film arranged on the back electrode.

6. The display according to claim 1, wherein the physically stabilized liquid crystal layer comprises one of a twisted nematic liquid crystal material, a cholesteric nematic liquid crystal material, a chiral nematic liquid crystal material, a nematic curvilinear aligned phase liquid crystal material, and a dyed chiral nematic liquid crystal material.

7. The display according to claim 1, wherein the electroluminescent layer is made of one of an inorganic material, a phosphor material, a zinc sulfide material, an organic light emitting diode material, and a light-emitting polymer material.

8. The display according to claim 1, wherein the barrier layer includes a material in which liquid crystal has a solubility lower than a solubility of liquid crystal in phosphor.

9. The display according to claim 1, wherein the barrier layer includes a hydrophilic material.

10. The display according to claim 9, wherein the hydrophilic material is a hydrophilic polymer.

11. The display according to claim 1, wherein the barrier layer comprises a polyvinyl alcohol or polyvinyl alcohol copolymer.

12. The display according to claim 11, wherein the polyvinyl alcohol copolymer comprises an ethylene vinyl alcohol copolymer.

13. The display according to claim 12, wherein the ethylene vinyl alcohol copolymer comprises less than 51% ethylene.

14. The display according to claim 11, wherein the polyvinyl alcohol or the polyvinyl alcohol copolymer has a degree of hydrolysis of between 72 and 99%.

15. The display according to claim 1, wherein the physically stabilized liquid crystal layer defines a mask of the display that is arranged to be switched on to display information.

16. The display according to claim 1, wherein the electroluminescent layer and the physically stabilized liquid crystal layer are separated from each other by another layer.

17. The display according to claim 1, wherein at least one of the first electrode and the second electrode is patterned.

18. The display according to claim 1, wherein the physically stabilized liquid crystal layer includes oblate spheroids of liquid crystal material dispersed in a supporting matrix.

* * * * *